United States Patent Office 3,422,505
Patented Jan. 21, 1969

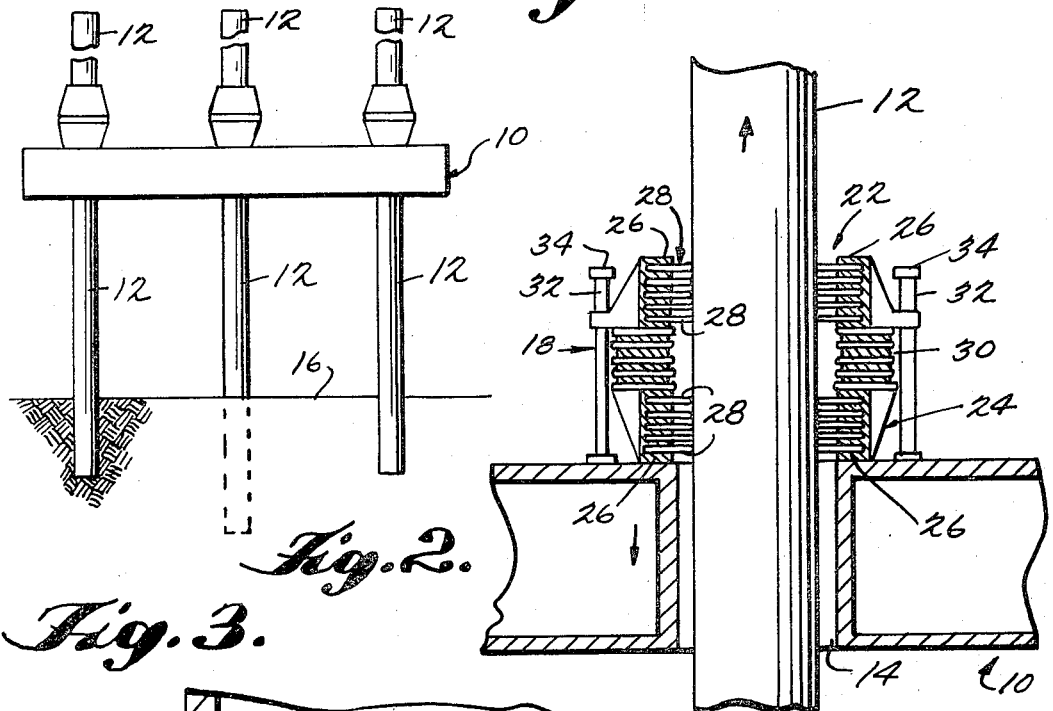
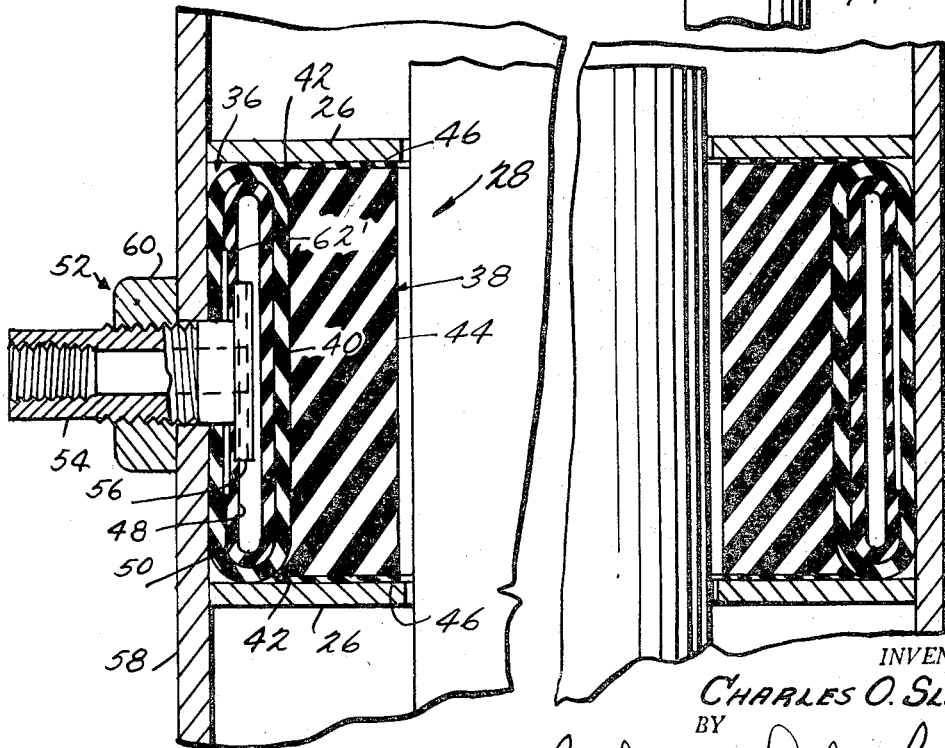

3,422,505
TWO-PIECE RELEASABLE GRIPPER
Charles O. Slemmons, Akron, Ohio, assignor to De Long Corporation, New York, N.Y., a corporation of Delaware
Filed Nov. 3, 1967, Ser. No. 680,575
U.S. Cl. 24—263        1 Claim
Int. Cl. E04b *1/56;* F16b *9/02*

ABSTRACT OF THE DISCLOSURE

A gripping assembly, for use in releasably securing a well-drilling platform or the like to a supporting leg, consists essentially of an inwardly facing annular channel member, an inflatable annular tube in the channel member and a separate resilient annular gripping member in the channel adapted to be contracted inwardly about the supporting leg upon inflation of the tube. The periphery of the annular resilient member is contoured to fit the wall of the inflatable tube so that the latter will expand uniformly thereby avoiding local areas of high stress which are likely to cause blowout of the tube after continued use.

DISCLOSURE

This invention relates to an improved pneumatic or hydraulic gripper assembly of the type generally employed in conjunction with a jack mechanism and arranged to surround a column, caisson or the like for releasably connecting a base or platform to the column.

Grippers of the kind under consideration include an annular inflatable tube or the like carried within an inwardly facing rigid channel member which surrounds an upright column. Inflation of the tube causes it to expand in the annular space between the channel and the column. In one type of known construction, the tube expands into tight engagement with a circumferential portion of the column. In another known type of construction, the tube moves a metal faced toothed member into engagement with the column. These mechanisms operate satisfactorily but suffer from a tendency of the inflatable tube to blow out under the severe operating conditions encountered during use.

The present invention is particularly concerned with improvements in the type of gripper disclosed, for example, in Pointer Patent No. 2,775,869, issued Jan. 1, 1957, and more recently in Suderow Patent No. 2,948,119, issued Aug. 9, 1960. These known grippers are of the kind, referred to above, in which the inflatable tube expands into direct contact with the column so that the holding force is generated by frictional engagement of the resilient rubber material of the tube with the exterior surface of the column. This construction is preferred in many installations over the use of toothed metal faced gripping elements, because it lends itself to easier control and avoids the possibility of scoring the sides of the column. There remains, however, the problem of a tendency for the tubes to blowout after prolonged service.

It has been found that the blowouts usually result from the repeated unequal stresses and eventual weakness which occur in different parts of the tube during inflation. One type of unequal stress is due to the fact that the tube has been constructed with rather thick walls, at least in the area which contacts the column, in order to withstand the abrading action. This reduces the overall flexibility of the tube with the result that expansion of the tube during inflation tends to concentrate at the bends between the inner, or column-engaging wall and the upper and lower walls. If only the inner wall is made thick, the problem of unequal stresses still exists, because the inner wall is then relatively rigid as compared to the other walls. Another type of stress occurs at the above-mentioned bends between inner wall and upper and lower walls as a result of the tendency of the bends to become pinched between the column and the rigid structure which holds the tube.

It is the principal object of the present invention to provide an improved pneumatic or hydraulic gripper which is less susceptible to blowouts than prior grippers due to the alleviation of high local stresses by a special two-piece resilient construction. At the same time, the two-piece construction facilitates the replacements of its parts under service conditions, a procedure which is recognized in the art as being difficult and time-consuming.

The advantages of the present construction are realized in great part by constructing the gripper with a relatively thick non-inflatable annular gripping element of rubber or like material which is a separate element from an outer inflatable, relatively thin-walled tube and which is contoured along its outer periphery so as to permit the walls of the tube to expand and contract uniformly. More specifically, the outer periphery of the gripping element is slightly concave along its edges so that the inner wall of the tube lies flush against the entire inner face of the gripping element rather than leaving a small gap at the edges of the latter. This arrangement allows all the walls of the tube to expand substantially uniformly and thereby reduces the high stresses which previously occurred in these areas.

The invention will be further understood from the following detailed description of an illustrative embodiment taken with the drawing in which:

FIGURE 1 is a schematic elevational veiw of an offshore platform of the jack-up type incorporating several of the improved gripper assemblies of the present invention;

FIGURE 2 is a fragmentary vertical sectional view of one of the gripper assemblies of FIGURE 1; and FIGURE 3 is an enlarged fragmentary view of part of the gripper assembly of FIGURE 2.

DETAILED DESCRIPTION OF THE INVENTION

Referring to FIGURES 1 and 2 there is shown a portable offshore buoyant platform 10, suitable for conducting well drilling operations, having a plurality of supporting legs 12 in the form of caissons extending through corresponding guide wells 14 in the platform 10. The legs 12, which may be of the order of six feet in diameter, provide stable support for the platform 10 when it is in its erected position, as shown, wherein the legs 12 have engaged and penetrated to various depths into a submerged bottom 16. Each leg 12 has associated therewith a jacking mechanism 18 which includes the improved gripper assembly of the present invention. As is well known in the art, jacking mechanisms in this type of installation operate to raise or lower the legs relative to the platform or to raise or lower the platform relative to the legs.

Each jacking mechanism 18, as shown schematically in FIGURE 2, includes vertically spaced upper and lower gripper sections 22 and 24, each comprising a caisson-surrounding rigid collar 26 or sleeve having a plurality of inner circumferential annular channels which face inwardly toward the caisson. Within each channel is an annular gripper assembly 28, illustrated schematically in FIGURE 2, which is adapted for positively yet releasably gripping the caisson 12 when the assembly 28 is supplied with high pressure fluid through a suitable connection (not shown in FIGURE 2). Between the upper and lower sections 22 and 24 is a caisson-surrounding, inflatable, bellows-like section 30 capable of exerting a powerful but controllable force to move the upper and lower sections 22 and 24 apart, while several pressure-cylinder retractors (not shown) are spaced about and connected to both the upper and lower sections to draw them toward each other when the bellows is exhausted.

Abutment means are provided on the platform to limit both downward movement of the lower jack section 24 relative to the platform 10 and upward movement of the upper jack section 22 relative to the platform 10. In the embodiment described the lower section 24 is engageable against the deck of the platform 10, while the upper section 22 is fastened to the platform 10 by a plurality of circumferentially-arranged tie rods 32. The upper section 22 is slidable on the rods 32, but upward movement is limited by heads 34 on the latter engageable by the upper section 22.

Each jack 18 can be operated to impart step-by-step vertical linear relative movement in either direction between its leg 12 and the platform 10. For example, in order to move the leg 12 upwardly relative to the platform 10, as shown by the upwardly pointing arrow in FIGURE 2, the lower section 24 engages the deck of the platform 10, the gripper assemblies 28 in the upper jack section 22 are engaged with the leg 12, and the bellows assembly 30 is inflated. When the jack 18 is operated to exert a downward force on the leg 12 to move the latter downwardly, as indicated by the downwardly-pointing arrow in FIGURE 2, it will be seen that the upper jack section 22 is engaged against the heads 34 of the tie rods 32 while the gripper assemblies 28 in the lower jack section 24 grip the leg 12, so that by inflating the bellows assembly 30 the leg 12 will be forced downwardly. Obviously, the platform 10 can be moved up and down along the legs 12 by operating the jacks 18 simultaneously after the lower ends of the legs 12 have been embedded in the submerged bottom 16.

All of the above features, broadly, are common to the general type of jack and gripper assembly described in the aforesaid Patent Nos. 2,775,869 and 2,948,119 and have been referred to here in order to present the present invention in the type of environment in which it is employed in practice.

Referring now to FIGURE 3, which illustrates the details of one of the special gripper assemblies 28, it will be seen that each assembly includes an inflatable tube 36 which surrounds a solid, annular gripper member or slug 38 of rubber or like material constructed as a separate piece from the tube 36 and surrounding the leg 12. The outer periphery of the slug 38 is contoured to fit the inner periphery of the tube 36, with the result that the outer surface has a vertical central portion 40 and upper and lower concave edge portions 42. The actual radius of curvature at the concave portions 42 will depend in part on the thickness of the wall of the tube 36 and the overall size of the assembly. For a tube having a ⅜ inch wall thickness and an assembly having an inside diameter of six feet the radius of curvature of the concave surfaces 42 may be, for example, about 9/16 inch. The surfaces 42 may be described in other terms as being defined by circumscribing lips projecting radially outwardly from the upper and lower edges of the body portion of the slug 38.

The inner periphery of the slug 38 is defined by a vertical cylindrical surface 44 which will frictionally engage the leg 12 when slug 38 is compressed radially inward by inflation of the tube 36. The upper and lower surfaces of the slug 38 are flat and are protected from abrasion with a covering 46 of high grade rubber.

The inflatable tube 36 is of uniform wall thickness and is constructed in two parts 48 and 50 which become bonded to each other during manufacture. The inner part 48 is a tubular air container made of rubber and is similar in general configuration to an inner tube for a motor vehicle tire. The outer part 50 is a sheet of rubber wrapped around the inner part 48 and adhered thereto by placing the two parts in a mold and applying heat and pressure. A spud 52 is provided for introducing compressed air into the tube 36. As shown the spud 52 includes a short tubular member 54 having a radial flange 56 at its inner end which clamps the outer peripheral wall of the inflatable tube 36 to the annular wall 58 of the supporting framework. The flange 56 is disposed inside the tube 36 and is drawn toward the wall 58 by tightening a nut 60 which threadedly engages the spud at a location on the opposite side of the wall 58. A compressed air line (not shown) from a suitable source on the platform 10 may be connected to the outer ends of the spud by an appropriate fitting. A woven fabric reinforcing sheet 62, embedded in the tube 36, surrounds the hole in the tube 36 through which the spud passes.

The inner peripheral wall of the tube 36 has a central vertical portion engaging the central portion 40 of the outer surface of the slug 38 and merging with the upper and lower tube walls to define external convex surfaces at the upper and lower edges of the tube. It is not desirable to form sharp corners in the tube wall, because this leads to non-uniform expansion when the tube is inflated.

When compressed air is applied to the interior of the tube 36 through the spud 52, the tube 36 becomes inflated and in so doing it compresses the slug 28 radially inwardly so that the inner surface 44 of the slug 28 frictionally engages the circumference of the leg 12. The special construction of the tube 36 and slug 38 results in uniform expansion of the tube 36 so that local areas of high stress are avoided. This uniform expansion occurs for several reasons, including the fact that the wall of tube 36 is of uniform thickness and the fact that the outside surface of the slug 38 coincides with the radius on the tube 36. The latter featrue allows the tube 36 to contact the full outer surface of the slug 38, thereby permitting a uniform expansion of the tube 36 along the concave surfaces 42 rather than creating areas of high stress at these locations such as would occur through the action of a rounded tube on a right angle against an abrupt corner. In addition, the walls of the tube can expand vertically in both directions, and radially in both directions, because there is no thickened inner wall as in prior constructions to retard expansion of that portion of the tube 36. This also contributes to the development of uniform stresses throughout the walls of the tube 36. The development of uniform stresses, that is the avoidance of local areas of high stress, reduces the tendency of the tube 36 to blow out after prolonged use and therefore is a highly desirable feature because the replacing of a tube is a time consuming operation.

The two piece construction provides another advantage in that it allows either the tube 36 or the slug 38 to be replaced in the respective channel member as required. The most vulnerable component is the tube 36 because of wear at the spud opening, oil leakage from air compressors into the tube 36 which causes the rubber to deteriorate, and tube failure due to fatigue after many cycles of expansion and contraction. The slug 38 may become brittle with age and non-use and develop cracks. Since either the tube or the slug can be replaced independently there is a savings in replacement costs.

What is claimed is:

1. In a device for releasably securing a well-drilling platform or the like to a supporting leg, said assembly including an annular channel structure having a web portion and inwardly directed flange members and a radially expansible and contractible annular gripper assembly disposed between the flange members for frictionally engaging the supporting leg, the improvmeent which reduces high local stresses during expansion of the assembly and thereby reduces blowout frequency, said improvement comprising a two-piece assembly including: an inflatable tube of generally uniform wall thickness disposed with its outer peripheral wall supported by the web portion of the channel structure, its upper and lower walls supported by the channel members and its inner peripheral wall arranged to move radially inwardly upon inflation of said tube, said inner peripheral wall having a planar central portion merging with the upper and lower walls to define external convex surfaces at the upper and lower edges of said tube; and an annular, rubber-like radially-compressible slug of greater radial dimension than the thickness of the tube wall disposed inwardly of said tube and having its outer peripheral wall in engagement with the inner peripheral wall of said tube, said outer peripheral wall of said slug having a planar central portion complementary to the planar central portion of the adjacent tube wall and having upper and lower lips projecting radially outward and defining concave surfaces complementary to and in engagement with the convex surfaces at the upper and lower edges of said tube, whereby the tube contacts the full outer surface of said slug so as to permit uniform expansion of the tube when it is inflated thereby reducing high local stresses in said tube.

References Cited
UNITED STATES PATENTS

| | | |
|---|---|---|
| 1,772,210 | 8/1930 | Dale. |
| 2,861,430 | 11/1958 | Bauer et al. _____ 61—46.5 |
| 2,934,804 | 5/1960 | Suderow. |
| 2,948,119 | 8/1960 | Suderow _____ 61—46.5 |
| 3,364,533 | 1/1968 | Sibrava et al. _____ 251—5 XR |

DONALD A. GRIFFIN, *Primary Examiner.*

U.S. Cl. X.R.

61—46.5